United States Patent [19]

Bronder

[11] Patent Number: 5,375,365
[45] Date of Patent: Dec. 27, 1994

[54] RELEASABLE SINKER FOR FISHING LINE

[76] Inventor: Joseph C. Bronder, 3702 S. Austin Blvd., Cicero, Ill. 60650

[21] Appl. No.: 189,758

[22] Filed: Feb. 1, 1994

[51] Int. Cl.⁵ .............................................. A01K 95/00
[52] U.S. Cl. ..................................................... 43/43.12
[58] Field of Search ................ 43/43.12, 44.96, 44.97, 43/43.1

[56] References Cited

U.S. PATENT DOCUMENTS

| | | | |
|---|---|---|---|
| 1,564,147 | 12/1925 | Stickley et al. | 43/43.12 |
| 3,195,262 | 7/1965 | Metzler | 43/43.12 |
| 4,138,795 | 2/1979 | Welle | 43/44.89 |
| 4,819,364 | 4/1989 | Lill | 43/43.1 |
| 4,926,580 | 5/1990 | Lin | 43/43.12 |

Primary Examiner—P. Austin Bradley
Assistant Examiner—Jeanne M. Elpel

[57] ABSTRACT

A releasalable sinker for attachment to a fishing line having a lure or bait attached thereto. The releasable sinker has a sinker body and a disengageable attachment member disengageably attached to the sinker body. The disengageable attachment member is attached to the fishing line. The sinker body has first and second angled engagement channels for disengageably receiving springable legs of the attachment member. As the sinker body becomes snagged, the springable legs of the attachment member pull free from the engagement channels so that the disengageable attachment member will disengage from the sinker body without the fishing line breaking. Thus, the lure or bait can be retrieved, even though the sinker body has been lost.

13 Claims, 1 Drawing Sheet

U.S. Patent  Dec. 27, 1994  5,375,365
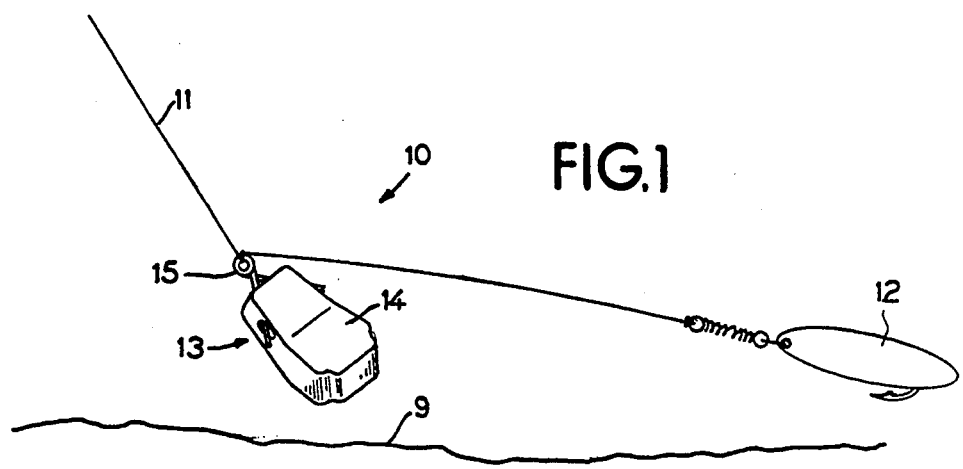
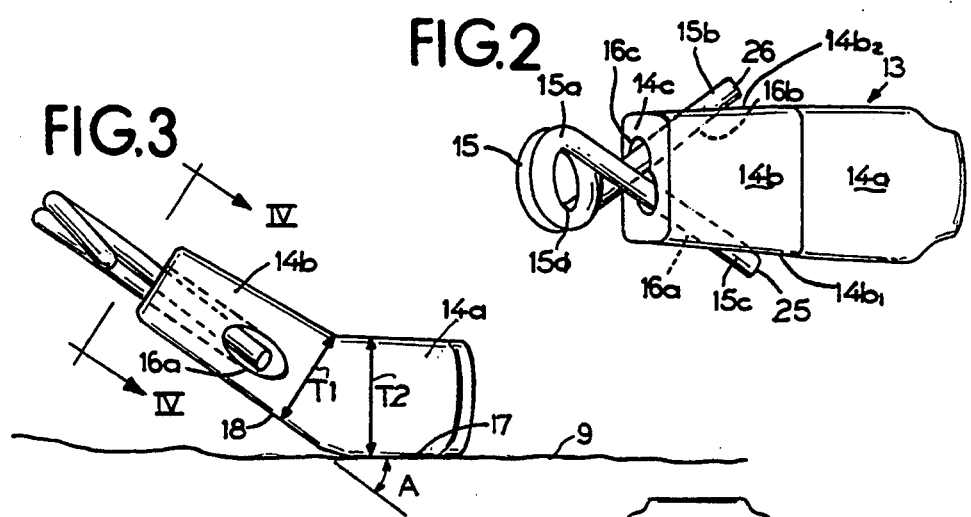
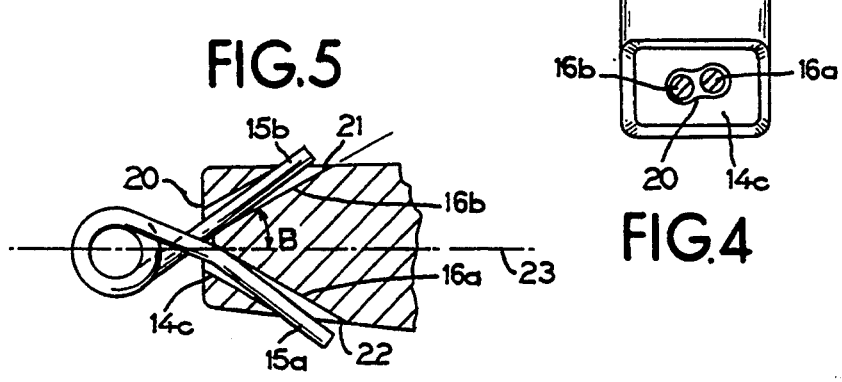
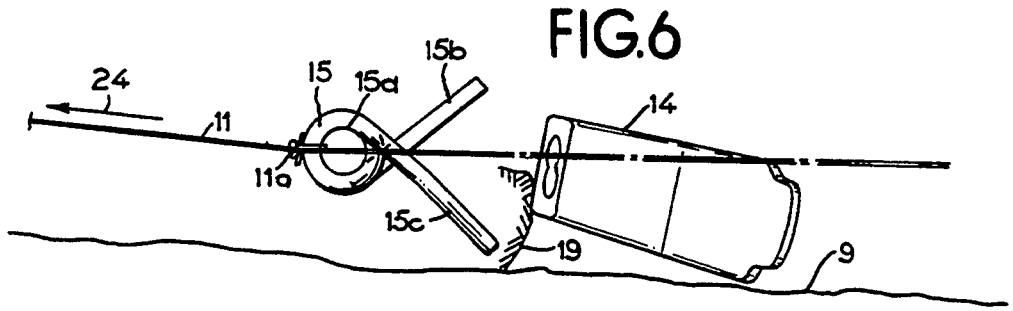

RELEASABLE SINKER FOR FISHING LINE

BACKGROUND OF THE INVENTION

The present invention relates to sinkers used on fishing lines.

Traditionally, fishing line sinkers have been attached to fishing lines either by crimping so-called "shot" sinkers around the fishing line, or by tying the fishing line to a wire loop which is firmly and permanently attached to the sinker.

With such previous sinkers for fishing lines, if the sinker is dragged along the bottom, it frequently occurs that the sinker becomes wedged between rocks, or snagged on tree limbs or other obstructions. If the fisherman is unable to free the sinker, the fisherman must either cut the fishing line or the fishing line breaks during the fisherman's efforts to free the sinker from the object to which it is snagged or caught on. This frequently results in the loss of the fishing lure or bait which trail the point where the sinker was tied onto the fishing line.

SUMMARY OF THE INVENTION

It is an object of the present invention to avoid the loss of a lure or bait if the sinker becomes snagged or caught on an obstruction either on the bottom or above the bottom.

According to the invention, a releasable sinker is provided formed of a sinker body and a disengageable attachment member in the form of a wire loop. The wire loop is tied to the fish line in such fashion that the lure or bait trails the sinker. If the sinker becomes snagged on rocks, tree branches, weeds, or the like, the disengageable attachment member pulls free from the sinker body, thus allowing the fisherman to retrieve the lure without breaking the fishing line. Furthermore, to resume fishing, the fisherman simply needs to reattach another sinker body to the disengageable attachment member.

BRIEF DESCRIPTION OF THE DRAWINGS

FIG. 1 is a perspective view of the releasable sinker for a fishing line according to the present invention:

FIG. 2 is a top view of the releasable sinker shown in FIG. 1;

FIG. 3 is a side view of the releasable sinker shown in FIG. 1;

FIG. 4 is an end view taken along line IV—IV in FIG. 3;

FIG. 5 is a fragmentary sectional view showing attachment of the disengageable attachment member to the sinker body; and FIG. 6 illustrates in perspective view disengagement of the disengageable attachment member from the sinker body if the sinker body becomes snagged.

DESCRIPTION OF THE PREFERRED EMBODIMENTS

The releasable sinker for a fishing line as attached to a fishing line with a lure is generally shown at 10 in FIG. 1. The end of the fishing line 11 is attached to a lure 12. Of course, the lure could also comprise a hook with a bait. The releasable sinker 13 is formed of a sinker body 14 and a disengageable attachment member 15 in the form of a wire loop.

As shown in FIGS. 2 and 3, the sinker body 14 is formed of a level trailer portion 14a and an inclined attachment portion 14b. Preferably, the level trailer portion 14a has a thickness $T_2$ which is greater than a thickness $T_1$ of the inclined portion. Furthermore, the level portion 14a has a bottom surface 17 adapted to ride along a bottom of the lake 9. The bottom surface 17 and the inclined surface 18 of the inclined portion 14b form an angle A in a range of about 20°–45°, and preferably about 30°. The overall size and weight of the sinker body varies, of course, depending upon the total weight desired by the fisherman. Thus, the releasable sinker of the present invention can be made in various weights and overall sizes to accommodate different fishing requirements.

The inclined body portion 14b has first and second circular angled engagement channels 16a, 16b proceeding from an end face 14c of the inclined portion 14b where they exit at opposite sidewalls 14b1 and 14b2 of the inclined portion 14b at exit apertures 21 and 22, as shown in FIG. 5. The leading end of the channels 16a, 16b form a common open aperture 20 as shown in FIGS. 2, 4, and 5.

The channels 16a, 16b form an angle B in a range of approximately 20°–40° and preferably about 30° with a bisecting longitudinal line 23 shown in FIG. 5.

The disengageable attachment member 15 is formed as a wire loop having preferably two turns as shown at 15a creating a central aperture 15d. Springable legs 15b and 15c protrude from the loop 15a. These springable legs 15a and 15b are received in the respective channels 16a and 16b in spring-loaded fashion as shown in FIG. 5, since the wire loop 15a is in a spring biased coiled configuration when the legs 15a and 15b are pinched together against the coiled spring force. It is in this condition that the legs are inserted into and retained in the engagement channels 16a and 16b.

As shown in FIG. 6, the fishing line is tied at 11a to the loop 15a. If the sinker body 14 strikes rocks 19 or the like and becomes entangled or snared thereat, the sinker body 14 releases from the disengageable attachment member 15 and the legs 15a and 15b then are in a further spread apart, condition after the attachment member has pulled free from the sinker body 14 as shown in FIG. 6.

By adapting the spring tension of the loop 15a, the release force 24 required to pull the disengageable attachment member 15 free from the sinker body 14 can be varied.

Preferably, the sinker body is made of lead or similar cast material and the disengageable attachment member comprises a spring steel. Furthermore, although two turns is preferred, a different number of turns could also be employed to alter spring force or resiliency of the spring legs.

In FIG. 2, the spring legs 15c, 15b have respective end portions 25 and 26 which project beyond the sidewalls 14b1, 14b2 of the inclined body portion. This results in a slower release of the disengageable attachment member from the sinker body. If a faster release is desired, these end portions can be shortened such that the spring legs 15b and 15c terminate within the sinker body before emerging from the retaining channels.

Furthermore, the gauge of the spring wire steel used for the disengageable attachment member can be varied to alter the release force required and to adapt different sinker body weights.

Although various minor changes and modifications might be proposed by those skilled in this art, it will be understood that I wish to include within the claims of the patent warranted hereon all such changes and modifications as reasonably come within my contribution to the art.

I claim as my invention:

1. A releasable sinker for attachment to a fishing line having a lure or bait attached thereto, comprising:

a sinker body and a disengageable attachment member disengageably attached to the sinker body, said disengageable attachment member being attachable to the fishing line;

said sinker body having a mounting structure for disengageably receiving said disengageable attachment member such that if the sinker body becomes snagged, the disengageable attachment member will disengage from the sinker body without the fishing line breaking so that the lure or bait can be retrieved; and said sinker body mounting structure comprising first and second angled channels said channels being straight, and said disengageable attachment member comprising a wire loop having first and second springable legs running at an angle with respect to one another and straight throughout their length and receivable in said angled channels when the springable legs are pressed towards one another so that the springable legs are in a biased condition against sides of the channels when the legs are received within the channels.

2. A releasable sinker according to claim 1 wherein the wire loop comprises approximately two turns and the legs protrude from respective ends of the wire loop in crossed fashion.

3. A releasable sinker according to claim 1 wherein the angled channels proceed from an end face of the body portion.

4. A releasable sinker according to claim 1 wherein the sinker body comprises a trailer portion and an inclined attachment portion, said inclined attachment portion having said mounting structure therein.

5. A releasable sinker according to claim 4 wherein said trailer portion has a flat bottom surface adapted to ride along a bottom of the lake, and wherein said trailer portion is angled relative to said inclined portion so that when the sinker body is being pulled through water, the trailer portion bottom surface will remain substantially horizontal and level.

6. A releasable sinker according to claim 1 wherein ends of the legs protrude beyond side walls of the sinker body.

7. A releasable sinker according to claim 1 wherein said mounting structure comprises first and second angled circular channels running from an end face of the sinker body where they form a common aperture, through the sinker body in angled fashion until they exit at outer side walls of the sinker body, and wherein said disengageable attachment member comprises a wire loop having springable cross legs received in said channels in spring loaded fashion by pressing the legs towards one another during insertion into the channels.

8. A releasable sinker according to claim 7 wherein said angled channels form an angle with respect to one another in a range from 20°–40°.

9. A releasable sinker according to claim 8 wherein the angle is approximately 30°.

10. A releasable sinker according to claim 1 wherein said sinker body has a trailer portion and an inclined attachment portion, and wherein the inclined attachment portion has a bottom surface forming an angle with the bottom surface of the trailer portion in a range from 20°–45°.

11. A releasable sinker according to claim 10 wherein said angle comprises approximately 30°.

12. A releasable sinker for attachment to a fishing line, comprising:

a sinker body and a disengageable attachment member disengageably attached to the sinker body, said disengageable attachment member having a loop for attachment to the fishing line;

said sinker body having engagement channels for disengageably and releasably receiving said disengageable attachment member such that if the sinker body becomes snagged, the disengageable attachment member will disengage from the sinker body channels without the fishing line breaking; and said engagement channels comprising first and second angled channels, said channels being straight, and said disengageable attachment member comprising a wire loop having first and second springable legs straight throughout their length and receivable in said angled channels when the springable legs are pressed towards one another so that the springable legs are in a biased condition against sides of the channels when the legs are received within the channels, and wherein the springable legs protrude from respective ends of the wire loop in crossed fashion and running at an angle with respect to one another, and the angled channels form an angle with respect to one another in a range from 20°–40°.

13. A releasable sinker for attachment to a fishing line, comprising:

a sinker body and a disengageable attachment member disengageably attached to the sinker body, said disengageable attachment member having a loop for attachment to the fishing line;

said sinker body having engagement channel means for disengageably and releasably receiving said disengageable attachment member such that if the sinker body becomes snagged, the disengageable attachment member will disengage form the sinker body channel means without the fishing line breaking; and said engagement channel means comprising first and second channels angled with respect to one another at an angle of between 20°–40° and said disengageable attachment member comprises a wire loop having at least one turn and crossed legs which cross prior to entry into said first and second angled channels, and wherein said first and second springable legs are straight throughout their length and are receivable in said angled channels when the springable legs are pressed towards one another so that the springable legs are in a biased condition against sides of the channels when the legs are received within the channels.

* * * * *

UNITED STATES PATENT AND TRADEMARK OFFICE
CERTIFICATE OF CORRECTION

PATENT NO. :   5,375,365
DATED      :   December 27, 1994
INVENTOR(S) :  Joseph C. Bronder It is certified that error appears in the above-indentified patent and that said Letters Patent is hereby corrected as shown below:

Col. 2, line 42, should read --further spread apart condition--.

Col. 3, line 21, should read --and second angled channels, said--

Signed and Sealed this

Twelfth Day of September, 1995

Attest:

BRUCE LEHMAN

*Attesting Officer*        Commissioner of Patents and Trademarks